US006688916B1

(12) United States Patent
Lee

(10) Patent No.: US 6,688,916 B1
(45) Date of Patent: Feb. 10, 2004

(54) SIGNAL CONNECTOR HAVING FUNCTION OF ABRUPT WAVE PROTECTION

(76) Inventor: Chun Te Lee, No. 98-1, Lane Chin She Beei., Twen Chu Taichung (TW)

( * ) Notice: Subject to any disclaimer, the term of this patent is extended or adjusted under 35 U.S.C. 154(b) by 0 days.

(21) Appl. No.: 10/326,073

(22) Filed: Dec. 23, 2002

(51) Int. Cl.[7] .......................... H01R 13/66; H02H 1/00

(52) U.S. Cl. ...................... 439/620; 439/583; 439/76.1; 361/119

(58) Field of Search ................................ 439/581, 582, 439/583, 620, 188, 76.1, 618–622; 361/119, 118, 57

(56) References Cited

U.S. PATENT DOCUMENTS 4,952,173 A * 8/1990 Peronnet et al. ............ 439/583
5,982,602 A * 11/1999 Tellas et al. ................ 361/119
6,249,415 B1 * 6/2001 Daoud et al. ............... 361/117
6,498,304 B1 * 12/2002 Hedstrom et al. ...... 174/149 R

* cited by examiner

*Primary Examiner*—P. Austin Bradley
*Assistant Examiner*—Briggitte Hammond
(74) *Attorney, Agent, or Firm*—Troxell Law Offices PLLC

(57) ABSTRACT

A signal connector having function of abrupt wave protection is provided with a grounding device on a signal transmitting cable to guide abrupt wave to the ground. Thus, electronic equipments can be normally used in a normal condition and also protected by the grounding device, which is bale to guide high voltage or large electric current to the ground if abrupt wave or lightning striking should occur.

6 Claims, 5 Drawing Sheets

SIGNAL CONNECTOR HAVING FUNCTION OF ABRUPT WAVE PROTECTION

BACKGROUND OF THE INVENTION

This invention relates to a signal connector, particularly to one provided with inside a connecting device of a signal transmitting cable for guiding abrupt wave to the ground so as to protect electronic equipments.

Generally, sound and video information of different frequencies is distantly transmitted to the electronic equipment used at home or in an office by means of cables, such as a TV antenna, computer process, network connection and the like. When a cable is led for a certain distance, a signal connector has to be provided on the cable for facilitating connecting another cable, which is led to a room.

A conventional signal connector, as shown in FIG. 1, has a fundamental base 1 provided thereon with a grounding device 2 and a connecting device 3. The grounding device 2 is provided with a hollow threaded base 4 for a conductive wire 6 in a ground wire 5 to contact with and be fixed therein by a press member 7 and a locking nut 8 to let abrupt wave transmitted to the ground by the ground wire 5. The connecting device 3 has its opposite sides provided with a round male adapter 9 for connecting a cable L, and the male adapter 9 has its outer shell connected with the fundamental base 1 and the ground wire 5. Therefore only the outer shell of the male adapter 9 has function of grounding, while the abrupt wave of the conductive wire in the cable L cannot be eliminated.

SUMMARY OF THE INVENTION

One objective of the invention is to offer a signal connector having function of abrupt wave protection, provided with an abrupt wave protective device, not only letting a normal signal transmitted smoothly in a normal condition, but also protecting electronic equipment by guiding abrupt wave to the ground in case high voltage or large electric current should occur.

Another objective of the invention is to offer a signal connector having function of abrupt wave protection, provided with a locking shell for an abrupt wave circuit board to be secured therein, letting the abrupt wave circuit board completely received in the locking shell and enabling the signal connector to be firmly locked in position.

BRIEF DESCRIPTION OF DRAWINGS

This invention will be better understood by referring to the accompanying drawings, wherein.

DETAILED DESCRIPTION OF THE PREFERRED EMBODIMENT

A preferred embodiment of a signal connector having function of abrupt wave protection in the present invention, as shown in FIGS. 2–7, includes a fundamental base 10, a grounding device 20, a connecting device 30 and a circuit board device 40 as main components combined together.

Figure 1:
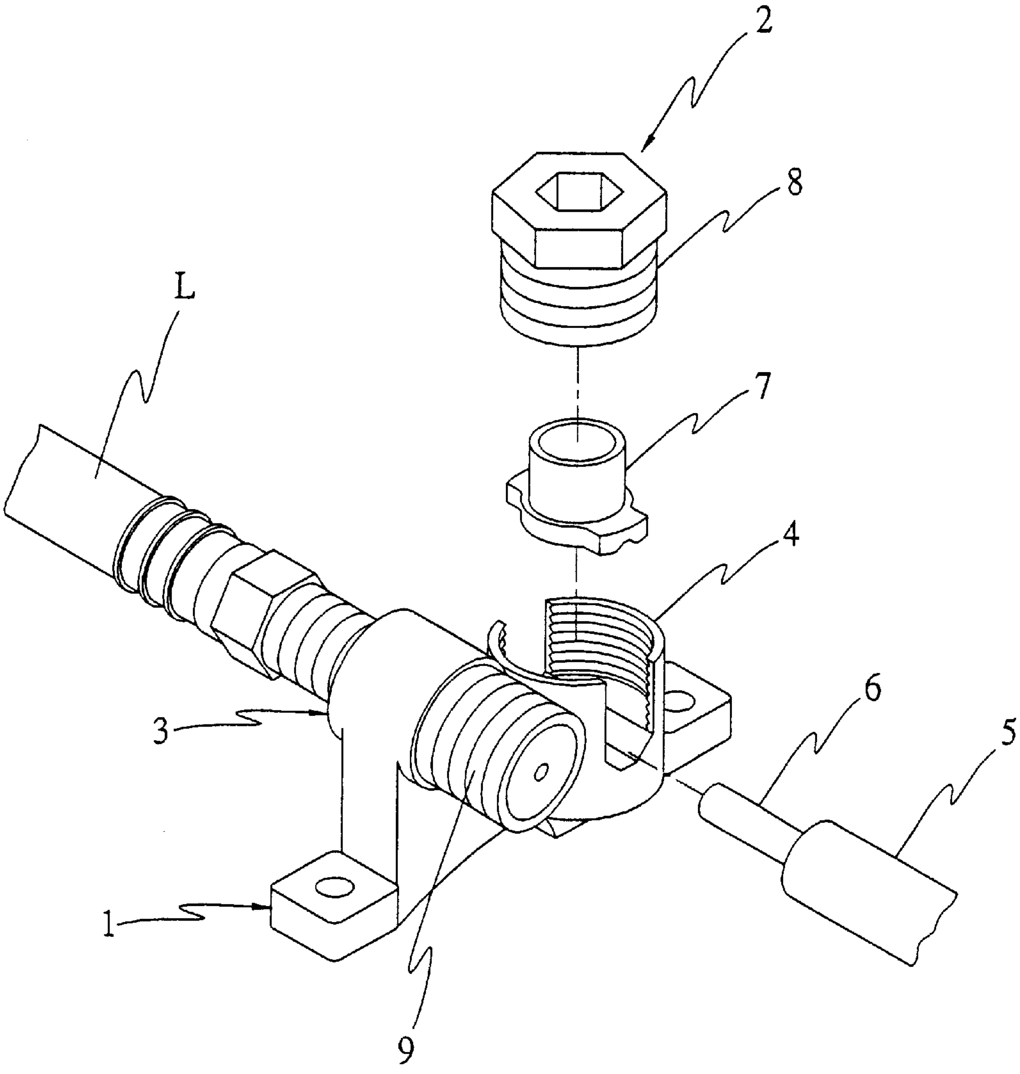
FIG. 1 PRIOR ART
FIG. 1 is an exploded perspective view of a conventional signal connector.
Figure 2:
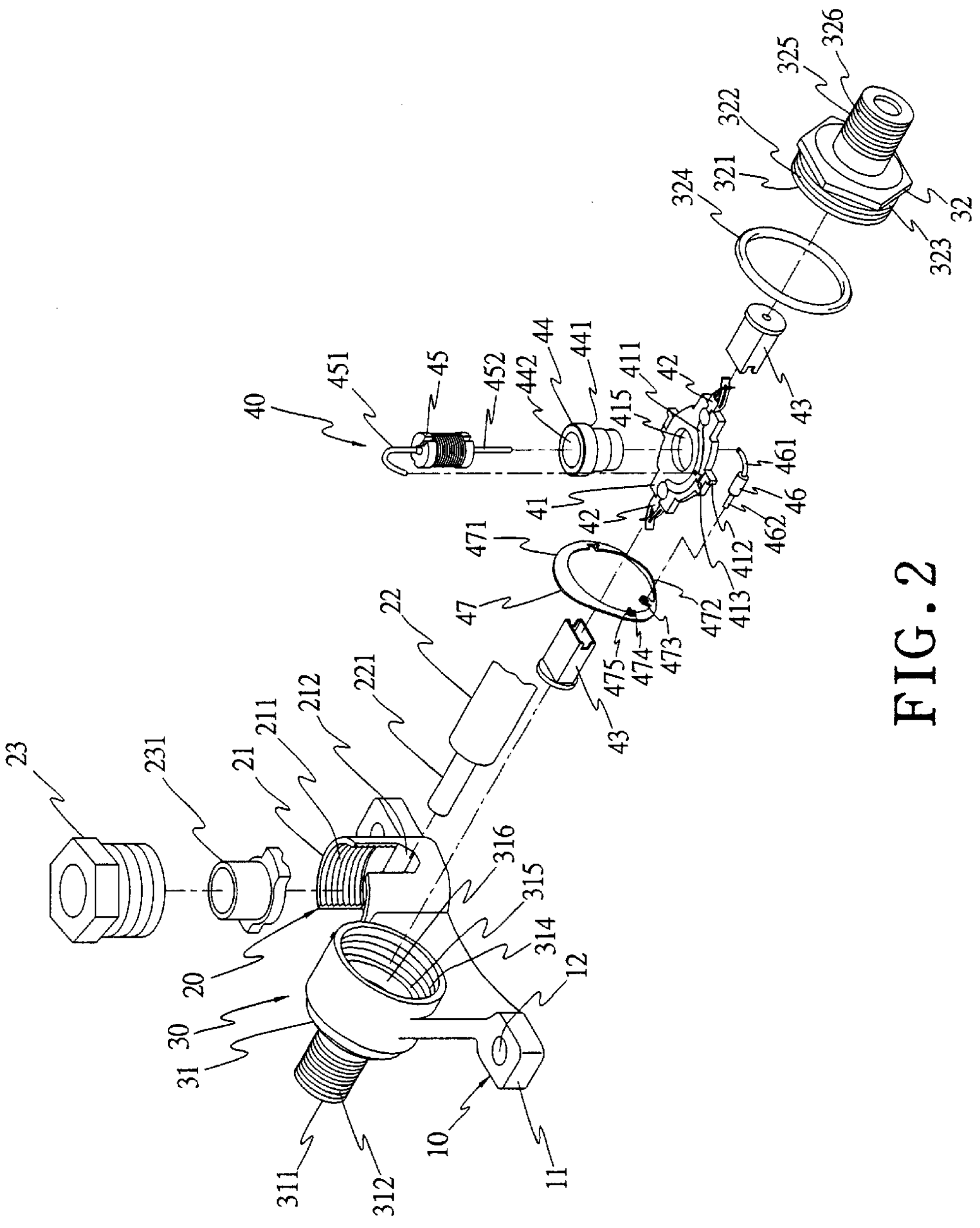
FIG. 2 is an exploded perspective view of a signal connector in the present invention.

The fundamental base 10, as shown in FIG. 2, has its inner and outer side extending and respectively making up a fixing foot 11 having a diametrical through round hole 12 for fastening the fundamental base 10 on a preset location.

The grounding device 20 is positioned at the outer side of the fundamental base 10, extending upward and forming a round and hollow threaded base 21 having threads 211 on the inner circumferential wall. The hollow threaded base 21 is provided with a U-shaped notch 212 respectively at the front and the rear side for the conductive wire 221 in a ground wire 22 to be positioned therein. The conductive wire 221 is pressed in the two U-shaped notches 212 by a press member 231 under a locking bolt 23 to conduct electricity to the ground, and the locking bolt 23 is threadably combined with the hollow threaded base 21.

Figure 4:
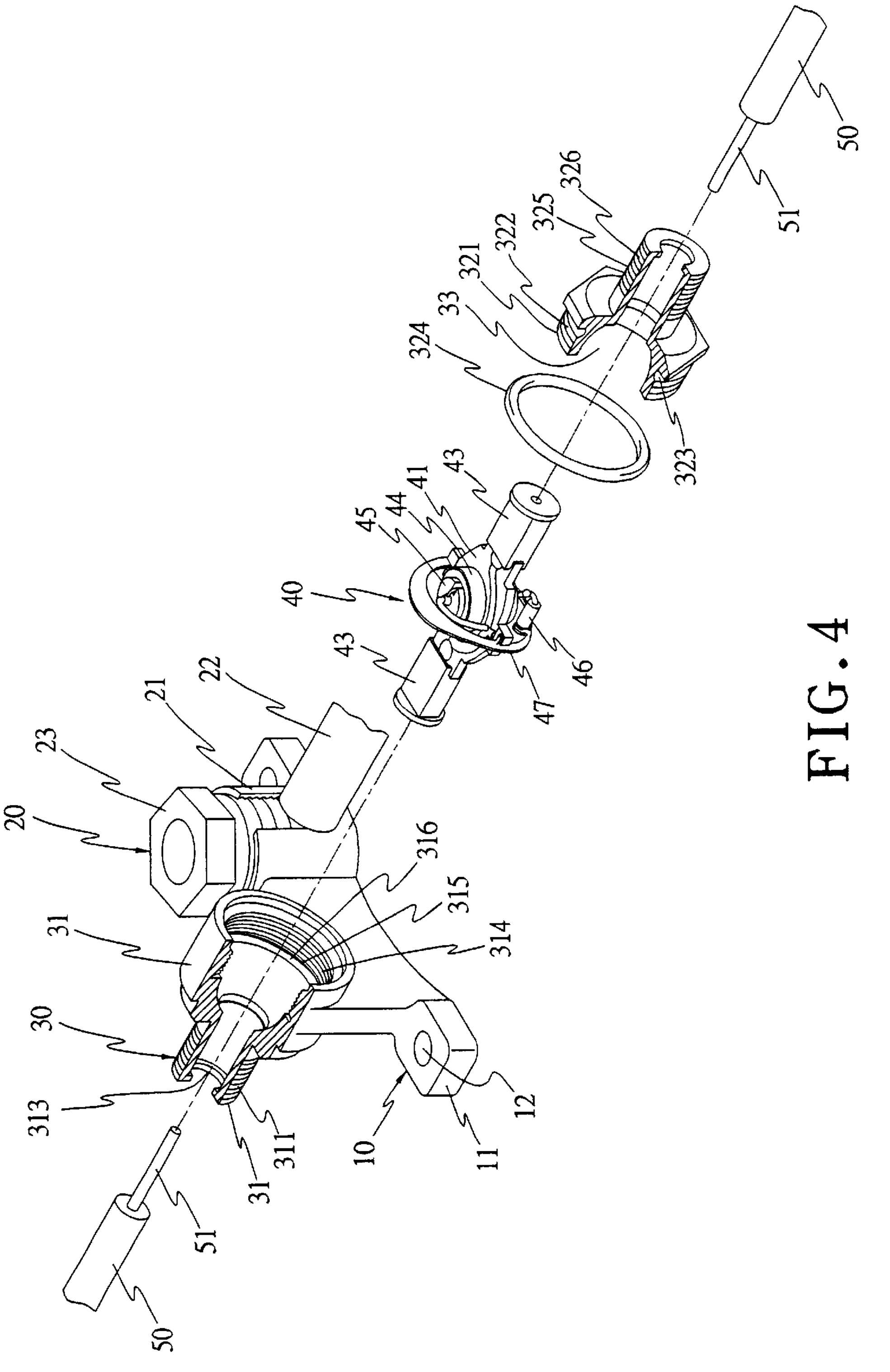
FIG. 4 is an exploded perspective and partial cross-sectional view of the signal connector in the present invention.

The metallic connecting device 30, as shown in FIGS. 2 and 4, is provided at the inner side of the fundamental base 10, having a hollow locking shell 31 in the center. The locking shell 31 is formed at the front end with a male adapter 311 having male threads 312 to be pivotally combined with a locking adapter (not shown) for connecting a cable 50. The male adapter 311 is provided with a stop ring 313 at the inner end, as shown in FIG. 4. Besides, the locking shell 31 is provided with female threads 314 on the inner wall, an annular recess 315 at the bottom and a shoulder 316 of a relatively small diameter in front of the annular recess 315. A fitting shell 32 positioned opposite to the locking shell 31 is formed at the front side with an inner connecting portion 321 having male threads 322 to be screwed with the female threads 314 of the locking shell 31 to combine the locking shell 31 with the fitting shell 32 and form an accommodating chamber 33 therein. Further, the fitting shell 32 has annular groove 323 formed between its front edge and the inner connecting portion 321 for an O-shaped gasket 324 to be fitted therein and a male adapter 325 disposed on its rear side, having preset male threads 326 on the outer edge.

Figure 3:
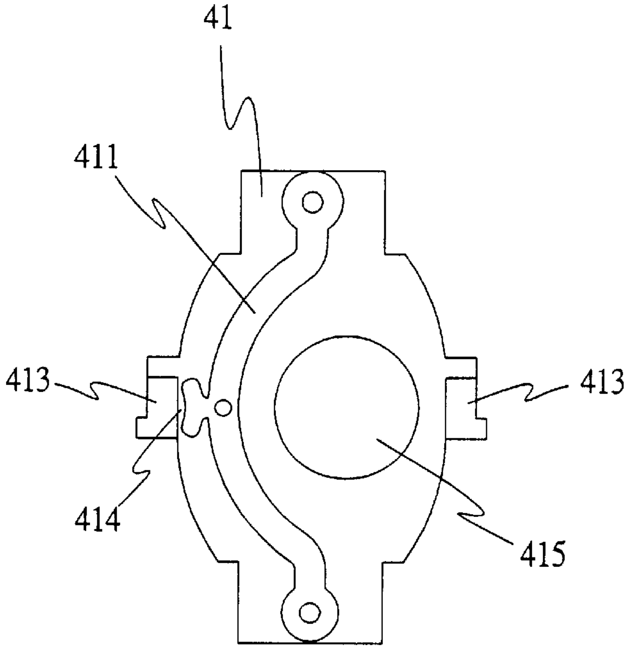
FIG. 3 is an upper view of the circuit board device of the signal connector in the present invention.

The circuit board device 40, as shown in FIGS. 2–4, is received in the accommodating chamber 33 of the connecting device 30. The circuit bored device 40 is provided with a circuit board 41 having a lengthwise conductive member 411 respectively on the opposite sides and has its left and right side respectively formed with a protruding-out stop member 412 at an intermediate portion to be stuck and secured on the shoulder 316 of the locking shell 31 when the circuit board device 40 is received in the accommodating chamber 33. A side conductive strip 413 is provided on the topside of the stop member 412, with a gap 414 formed between the outer side of the conductive member 411 and the side conductive strip 413. Be sides, the conductive member 411 has its front and rear terminal respectively firmly welded with a clamp adapter 42 to be fitted with an insulating sleeve 43, and then the clamp adapter 42 and the insulating sleeve 43 are together received respectively in the male connectors 311 and 325 of the locking shell 31 and the fitting shell 32.

In addition, the circuit board 41 is bored with a through round hole 415 in the center for a cylindrical insulating tube 44 to be vertically fitted therein. The insulating tube 44 is formed with a shoulder 441 on its outer edge to be firmly positioned on the round hole 415 of the circuit board 41 and an accommodating hole 442 in the center for receiving an electric induction member 45. The electric induction member 45 has its upper terminal 451 welded with the conductive member 411 and its lower terminal 452 connected in series with the first terminal 461 of an abrupt wave absorbing member 46, which has its second terminal 462 connected with a metallic fixing ring 47.

The fixing ring 47 is cone-shaped and composed of an outer ring 471 of a comparatively large diameter and an inner ring 472 of a comparatively small diameter. The inner ring 472 is bored with an engage hole 473 to be welded with the second terminal 462 of the abrupt wave-absorbing member 46. The inner ring 472 further has its opposite ends respectively bored with a cut groove 474 having a horizontal foot 475 formed at one side to be welded with the side conductive strip 413 to let the fixing ring 47 secured on the circuit board 41. The fixing ring 47 is compressed to stick firmly in the annular recess 315 of the locking shell 31 after the circuit board 41 is received in the accommodating chamber 33.

In assembling, the insulating tube 44 is fitted in the round hole 415 of the circuit board 41, and the electric induction member 45 is received in the insulating sleeve 44 to let the circuit board 41 and the electric induction member 45 separated and insulated vertically from each other. Then, the electric induction member 45 has its upper terminal 451 welded with the conductive member 411 and its lower terminal 452 welded with the first terminal 461 of the abrupt wave absorbing member 46, which has its second terminal 462 welded with the engage hole 473 of the fixing ring 47. Subsequently, the fixing ring 47 has its two horizontal feet 475 respectively welded with the two side conductive strips 413. Thus, the fixing ring 47 can be engaged in the annular recess 315, and the two stop members 412 of the circuit board 41 can be stuck on the shoulder 316 of the locking shell 31, when the circuit board device 40 is received in the locking shell 31. Finally, the fitting shell 32 is threadably combined with the locking shell 31, with the O-shaped gasket 324 fitted in the annular groove 323 of the fitting shell 32 to prevent the accommodating chamber 30 from dampening.

Figure 7:
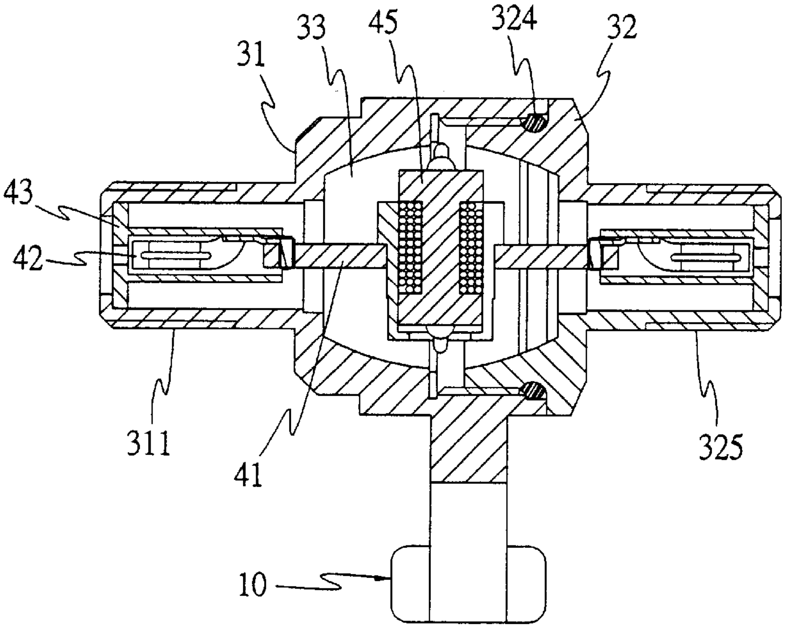
FIG. 7 is a cross-sectional view of a connecting device assembled in the signal connector in the present invention.
Figure 5:
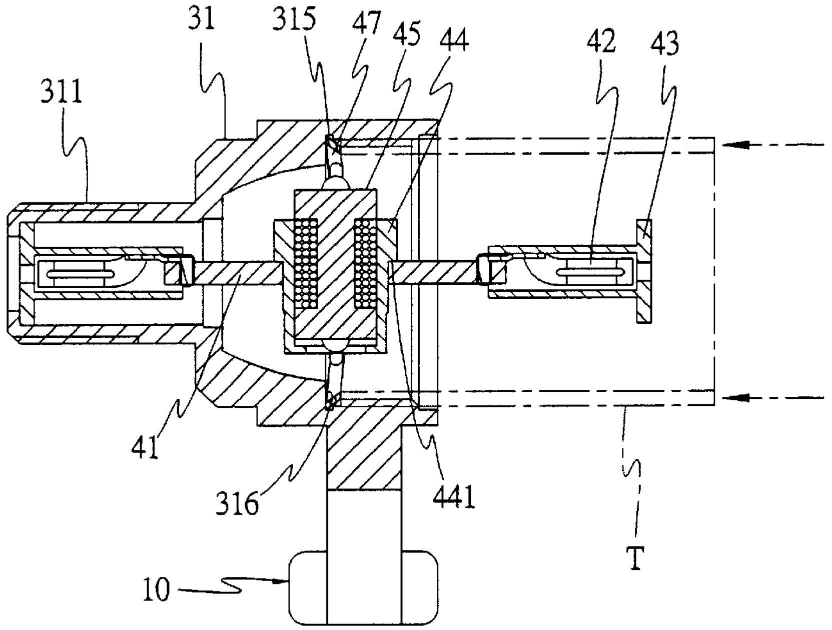
FIG. 5 is a cross-sectional view of the circuit board device in a compressed condition in the present invention.
Figure 6:
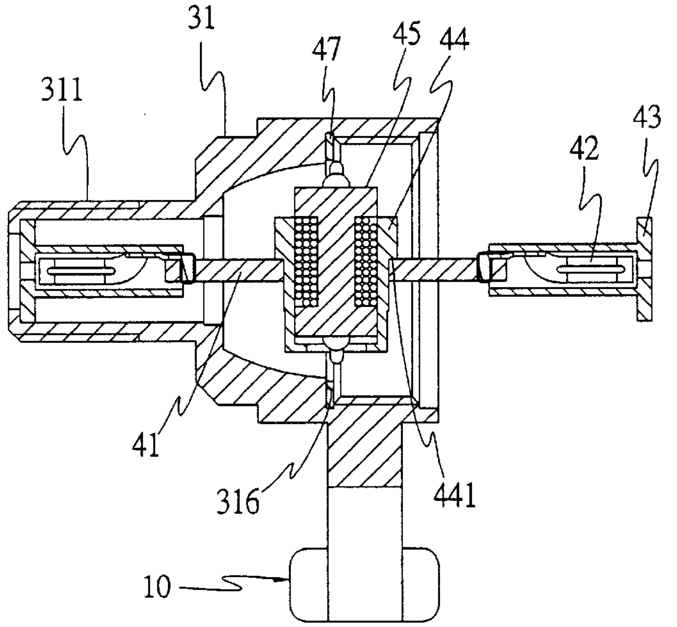
FIG. 6 is a cross-sectional view of the circuit board device assembled in the signal connector in the present invention.

Further, the fixing ring 47 made of flexible metal has its opposite connecting member 475 welded firmly on the circuit board device 40 and its engage hole 473 couple with the abrupt wave absorbing member 46. After the circuit board device 40 is fitted in the connecting device 30 and the flexible fixing ring 47 is received in the locking shell 31, the fixing ring 47 is compressed by a press tool T to become deformed and stuck firmly in the annular recess 315 inside the locking shell 31, as shown in FIGS. 5 and 6. Thus, the fixing ring 47 is completely contact flatly with the metallic fundamental base 10, impossible to shift or fall off and having good capacities of electric conduction and grounding. Furthermore, the fitting shell 32 is threadably combined with the locking shell 31 and the circuit board device 40 is received in the accommodating chamber 33 inside the connecting device 30, as shown in FIG. 7, therefore the signal connector of this invention has functions of signal connection and abrupt wave absorption.

When the electric current of the electric induction member 45 and the abrupt wave absorbing member 46 does not reach a critical value and forms an open circuit, signals can be normally transmitted by the conductive member 411 from the conductive wire 51 of a cable 50 at one side of the conductive member 411 to the conductive wire 51 of another cable 50 at the other side, as shown in FIGS. 2 and 3. But, in case a large current of abrupt wave should occur and the electric current of the electric induction member 45 and the abrupt wave absorbing member 46 rises to exceed the critical value and forms a short circuit, the conductive member 411 can guide the electric current to the fixing ring 47 and the connecting device 30 for grounding, able to completely release the electric current of abrupt wave to the ground.

Moreover, between the conductive member 411 and the side conductive strip 413 forms a very small gap 414, so that when abrupt wave occurs, the abrupt wave of the conductive member 411 can flow to the side conductive strip 413 through the gap 414 and then is guided to the ground by the fixing ring 47. Evidently, the fixing ring 47 together with the connecting device 30 has functions of electric connection and grounding and is able to completely release abrupt wave to the ground.

While the preferred embodiment of the invention has been described above, it will be recognized and understood that various modifications may be made therein and the appended claims are intended to cover all such modifications that may fall within the spirit and scope of the invention.

I claim:

1. A signal, connector having function of abrupt wave protection comprising a fundamental base, a grounding device, a connecting, device, a circuit board device and an abrupt wave absorbing member:

Said fundamental base provided at the upper side with said grounding device and said connecting device said connecting device provided with a locking shell, said locking shell formed with a male adapter on a front side for connecting a cable, said locking shell theradably combined with an inner connecting portion of a fitting shell to form an accommodating chamber therein, said fitting shell formed with a male adapter at the rear side for connecting an other cable:

Said circuit board device received in said accommodating chamber, said circuit board device having, a circuit board provided thereon with a lengthwise conductive member, a side conductive strip positioned adjacent to the outer side of said conductive member, between said conductive member and said side conductive strip formed a gap of a preset size, said conductive member having its opposite ends respectively welded with a clamp adapter for connecting an insulating sleeve, said clamp adapter together with said insulating sleeve received in said male adapter, an electric induction member received in the center of said circuit board: and Said abrupt wave absorbing member having its first terminal connected in series with said electric induction member, said gap formed between said conductive member and said conductive strip able to guide the abrupt wave of said conductive member to said side conductive strip, said conductive strip and said connecting device combined together to guide the abrupt. wave to the ground.

2. The signal connector having function of abrupt wave protection as claimed in claim 1, wherein said grounding device is formed with a hollow threaded base for receiving a ground wire to conduct electricity, with a locking bolt threadably combined with said hollow threaded base.

3. The signal connector having function of abrupt wave protection as claimed in claim 1, wherein said electric induction member is received in said insulating sleeve and then the both are fitted in the center hole of said circuit board.

4. The signal connector having function of abrupt wave protection as claimed in claim 2, wherein said circuit board device has its left and right side respectively formed with a stop member, and said conductive strip is positioned on said stop member for said fixing ring to be welded thereon.

5. The signal connector having function of abrupt wave protection as claimed in claim 1, wherein said connecting device is provided in the inner bottom with an annular recess and a shoulder, a fixing ring is composed with an outer ring of a comparatively large diameter and an inner ring of a comparatively small diameter; the inner ring is bored with an engage hole to be welded with the second terminal of said abrupt wave absorbing member and a cut groove respectively at the opposite ends, having a connecting member to be connected with said connecting device for guiding said abrupt wave to the ground by means of said grounding device.

6. The signal connector having function of abrupt wave protection as claimed in claim 5, wherein the inner connecting portion of said fitting shell has its rear end formed with an annular groove for fitting an O-shaped gasket therein to prevent said accommodating chamber from dampening.

* * * * *